United States Patent Office.

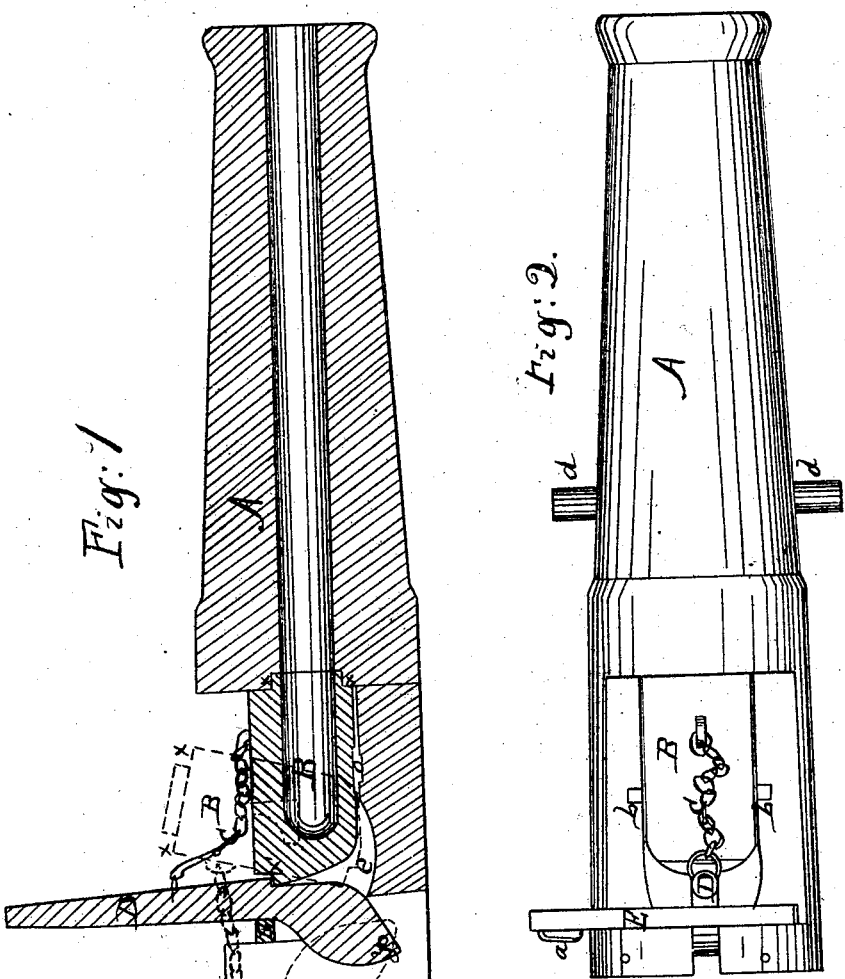

LUCIUS M. LULL AND JAMES T. STARR, OF WALNUT GROVE, ILLINOIS.

Letters Patent No. 74,557, dated February 18, 1868; antedated February 6, 1868.

IMPROVEMENT IN BREECH-LOADING ORDNANCE.

*The Schedule referred to in these Letters Patent and making part of the same.*

TO ALL WHOM IT MAY CONCERN:

Be it known that we, LUCIUS M. LULL and JAMES T. STARR, of Walnut Grove, in the county of Knox, and in the State of Illinois, have invented certain new and useful Improvements in Breech-Loading Cannon; and do hereby declare that the following is a full, clear, and exact description thereof, reference being had to the accompanying drawings and the letters of reference marked thereon, making a part of this specification.

In the annexed drawings, A represents a cannon, constructed of the usual materials, and provided with an oblong-shaped breech in the rear end. Within this breech is placed a cylinder, B, which lies upon the bed at the bottom of the breech, and connected to the cannon by means of trunnions, b b, which fit into L-shaped grooves on each side of the breech. This cylinder is made rounding at its lower side and at its end, to correspond with the shape of the bed, which is slightly cut out at the rear (as shown at e, Figure 1) for the rear end of the cylinder when in a vertical position.

The rear end of the cannon-bore has a shoulder formed around it, so as to secure the collar x, made on the front end of the cylinder B, and secure it in its place.

D represents a lever, which is pivoted in a vertical slot (at y) in the rear end of the cannon, and which is connected to the cylinder by a chain, C, with a hook, so that it can readily be detached from the gun. This lever has a shoulder, x', upon its forward face, which fits over a corresponding shoulder on the upper rear end of the cylinder B.

E represents a horizontal bar, pivoted at one side of the gun, in the rear of the lever, and is intended to lie upon the cannon in the rear of the lever, for holding upon the shoulder of the cylinder. This bar has a metal loop, a, at its outer end, for tying or chaining the said bar to the ground or carriage.

It will be seen that, when the lever D is in a vertical position, the cylinder is held in its place by the collar x, under the cannon-bore, and the shoulder x', upon the lever, so that there is but little danger of the cylinder being thrown from its place by the concussion.

In loading the gun, the bar E is thrown from behind the lever, and the lever drawn to the rear, carrying the cylinder with it by the chain C. There may be a small roller, o, placed underneath this cylinder for facilitating its movements for loading. The cartridge is placed within the cylinder when in the position as shown in the dotted lines in fig. 1, and the cylinder then thrown down and forced into position.

By this invention, there is no danger from premature discharges, and the gun can be made inoperative should it be in use when retreating.

By withdrawing the lever D and bar E, the cannon cannot be used, while the two said parts can be easily carried off by the persons retreating.

Having thus fully described our invention, what we claim as new, and desire to secure by Letters Patent, is—

The breech-block or cylinder B, constructed as herein described, and used in combination with a cannon, provided with lever D, chain C, and bar E, when constructed in the manner substantially as and for the purposes specified.

In testimony that we claim the foregoing, we have hereunto set our hands, this sixth day of April, 1867.

LUCIUS M. LULL,
JAMES T. STARR.

Witnesses:
A. P. STEPHENS,
GEORGE McKOWN.